UNITED STATES PATENT OFFICE.

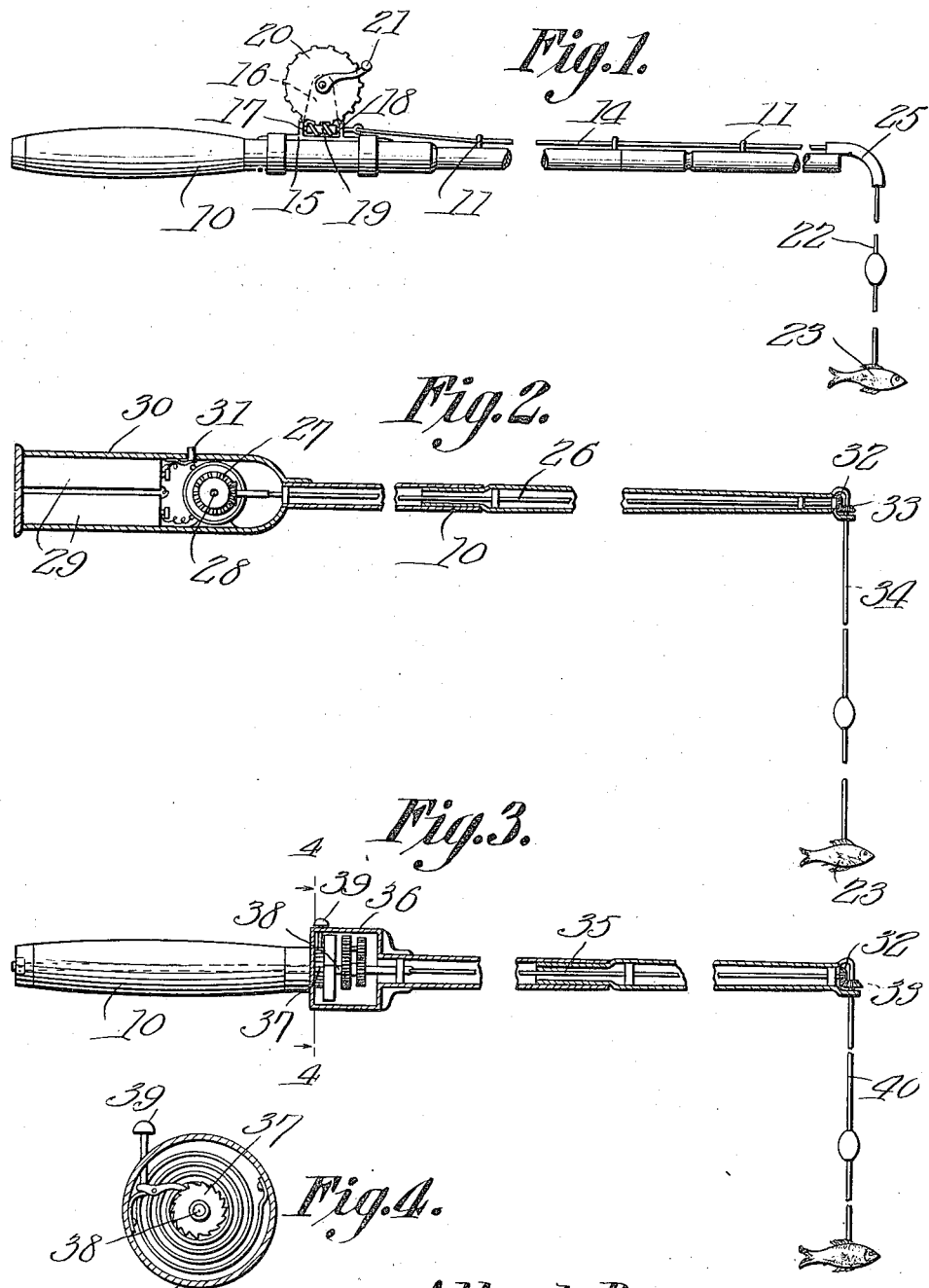

ALBERT BEYER, OF COLEMAN, TEXAS.

FISH-CATCHING APPARATUS.

1,122,466.   Specification of Letters Patent.   Patented Dec. 29, 1914.

Application filed June 10, 1913. Serial No. 772,901.

*To all whom it may concern:*

Be it known that I, ALBERT BEYER, a citizen of the United States, residing at Coleman, in the county of Coleman and State of Texas, have invented a new and useful Fish-Catching Apparatus, of which the following is a specification.

This invention relates to an improvement in fish catching apparatus.

One object of the present invention is to provide a fish catching apparatus which will move artificial bait about in the water to thus attract the attention of fish and promote and facilitate their capture.

A further object of this invention is to provide a fish rod with a fish line secured thereto and with means mounted upon the said rod engaging the fish line adapted to rotate said fish line about its longitudinal axis, the said means being in the form of an electric or spring motor or by means of a hand driven reel.

A further object is to provide a fish rod with a fish line secured thereto, which line may be of wire if so desired and to provide a hand or power driven motor upon the rod which is adapted to engage and rotate the said fish line so that the artificial minnow bait which is secured to the lower extremity of the line will be whirled about to imitate the movements and have all the appearance of live bait.

A further object is to provide a fish catching apparatus which will be particularly efficient in attracting the attention of the fish and the catching thereof.

With the foregoing and other object in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings, Figure 1 is a view in elevation showing a manually operated guiding mechanism. Fig. 2 is a sectional view, showing the shaft driven by an electric motor, and Fig. 3 is a view showing the same driven by a spring motor. Fig. 4 is a section on the line 4—4 of Fig. 3.

Referring to the drawings in which similar reference numerals designate corresponding parts throughout the several views, a rod 10 of any suitable construction is provided with bearing eyes 11 at spaced intervals therealong. These bearing eyes support a shaft 14, upon the rear extremity of which, is disposed a worm gear 19. An upstanding U-shaped bracket 16 is secured to the fishing rod and supports a gear 20.

The U-shaped bracket includes suitable members 17 and 18, rotatably supporting the shaft 14 adjacent the extremities of the worm gear 19. A crank 21 is connected to the gear 20 and provides for the manual rotation of the same to thus impart rotation to the shaft 14. The extreme outer end of the shaft 14 passes through a sleeve 25 which is secured to the rod adjacent the tip. The fish line 22 is secured to the extremity of the shaft within the sleeve and carries at its lower extremity the artificial bait 23. In this connection it is to be noted that the artificial bait 23 is in the form of a minnow or small fish and is of the usual and conventional construction, and includes suitable hooks, the same not being illustrated as the end in view is to conceal the hooks as much as possible.

In some instances it has been found preferable to provide power means in order to forcibly rotate the shaft. With this in view, the mechanism illustrated in Figs. 2, 3 and 4 has been provided and in Fig. 2 the rod is hollow in which is housed and rotatably mounted the shaft 26. The gear 27 carried by the electric motor 28 is adapted to drive the shaft 26. In order to supply current to the motor, the batteries 29 are provided in the handle 30 of the rod and controlling the circuit of which batteries is the push button 31. The shaft 26 is provided at its terminal adjacent the tip of the rod with a gear. The line 34 which may be made of metal rod is secured at its upper extremity to a gear 33 which meshes with and is driven by the gear 32. Thus it will be apparent that the electric motor will by rotating the shaft 26, impart a rotary motion to the line 34 and therefore move the bait 23 so as to impart thereto the appearance of live bait. In the form shown in Fig. 3 a spring motor is provided for rotating the shaft 35. This motor is housed by the casing 36 the ratchet wheel 37 which is mounted on the shaft 38 to which the shaft 35 is connected, being controlled in its movement by the button 39, the line 40 which supports the bait being rotated by the same construction as shown in Fig. 2. In this connection it is to be noted that the details of the spring motor have not been illustrated as it may be constructed in any desired manner, provided that it will either continuously or intermittently rotate the shaft 35 and at such speed as will be consistent with the best practice in attracting the attention and the capturing of fish.

The many advantages of the present apparatus it is thought will be readily appreciated. Among the more salient features of the device, attention is called to the fact that the bait will be moved about in the water and by properly controlling the rotation of the shafts 14, 26 or 35, the bait may be caused to dart or to move suddenly about, or to move slowly and continuously. In this respect, the artificial bait by moving about, will simulate the movements of small fish and will thus be efficient in attracting the attention and facilitating the capture of fish, which is the ultimate object in view.

What is claimed is:—

1. In a device of the class described a rod, eyes arranged on said rod, a shaft supported to rotate by said eyes, a bracket receiving one terminal of said shaft, a worm arranged on said shaft, means for rotating said worm, a curved extension arranged on the tip of the rod, said shaft extending through said extension, and a fish line secured to the end of the said shaft and adapted to be rotated thereby.

2. In a device of the class described, a rod, a shaft supported by said rod, a bracket receiving one terminal of said shaft, a worm arranged on said shaft, means for rotating said worm, a curved extension arranged on the tip of the rod, said shaft extending through said extension, and a fish line with artificial bait thereon secured to the end of said shaft and adapted to be rotated thereby.

3. In a device of the class described, the combination of a fishing rod, a fish line carried thereby, and means carried by the said rod engaging the line and adapted to rotate the latter about its longitudinal axis.

4. A fishing device comprising a rod, a fish line carried thereby, artificial bait carried by said line, and means carried by the said rod engaging the said line adapted to rotate the latter about its longitudinal axis to impart motion to said artificial bait.

5. In a device of the class described, the combination of a fish rod, a shaft extending longitudinally thereof and supported thereby, means for rotating said shaft, a fish line connected to the extremity of said shaft and adapted to be rotated about its longitudinal axis thereby, and artificial bait carried by the said line adapted to simulate the motions of live fish by the rotation of said line.

6. In a device of the class described, the combination of a fishing rod, a shaft carried thereby and extending longitudinally thereof, means for rotating said shaft, a fish line extending at right angles to said shaft, and means for transmitting rotary motion from said shaft to said line for the rotation of the latter.

7. An apparatus of the class described comprising a fishing rod, a shaft carried thereby, means carried by said fishing rod engaging said shaft and adapted to rotate the same, a fish line secured to and adapted to be rotated by the said fish, and artificial bait secured to said line and adapted to be rotated thereby.

In testimony that I claim the foregoing as my own, I have hereto affixed my signature in the presence of two witnesses.

ALBERT BEYER.

Witnesses:
  T. F. ROBB,
  J. R. STRONG